No. 635,845. Patented Oct. 31, 1899.
T. COOPER & W. H. WOODCOCK.
ROLLER BEARING.
(Application filed May 1, 1899.)
(No Model.) 2 Sheets—Sheet 1.
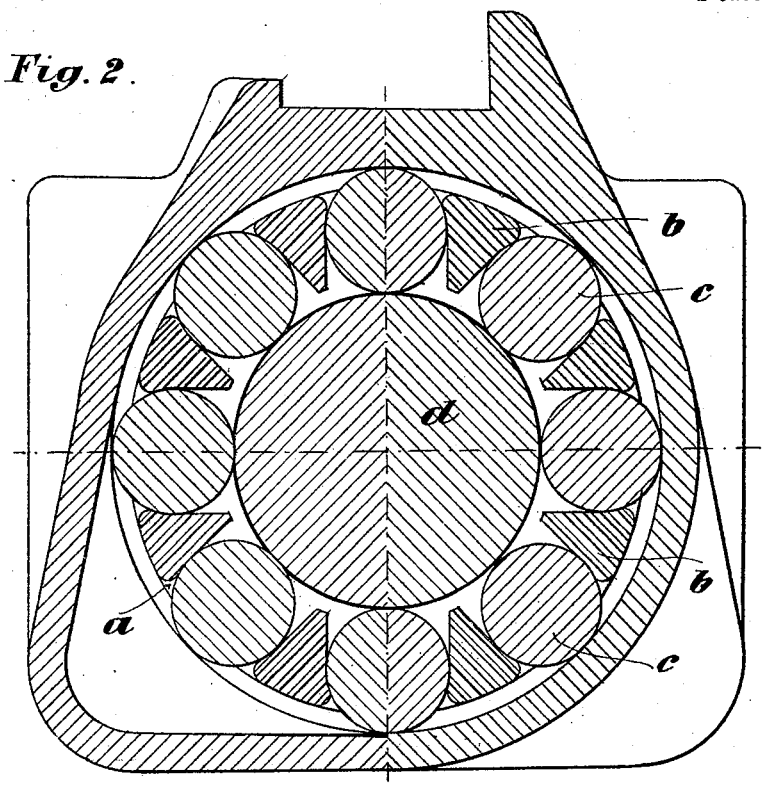
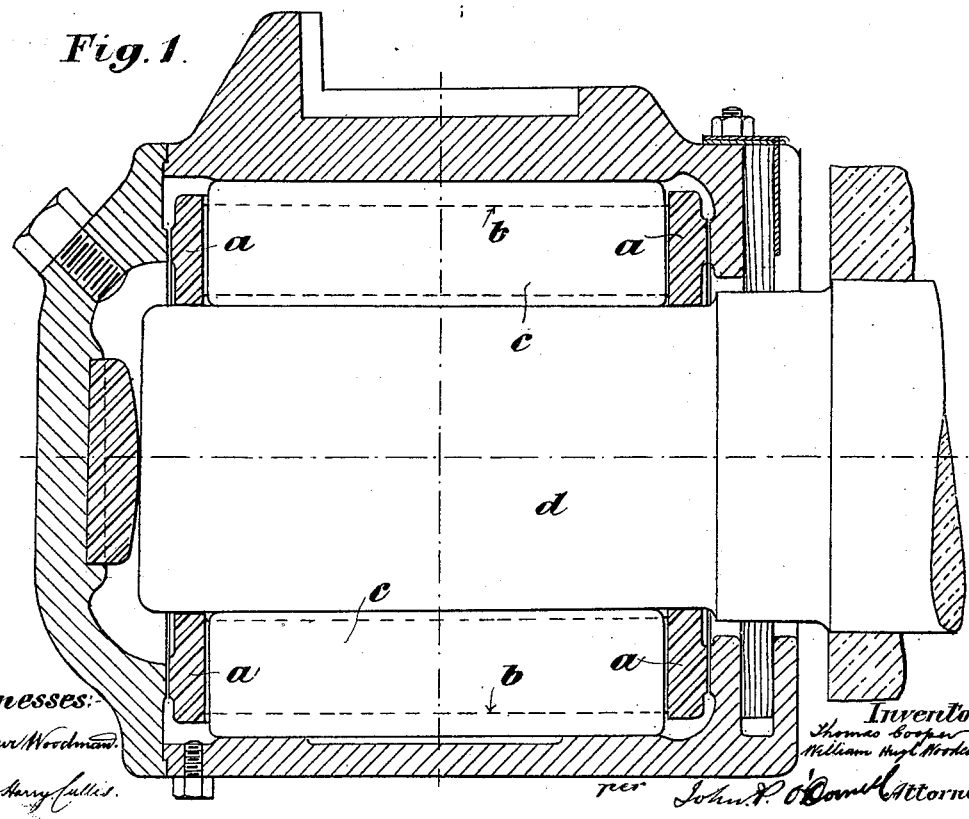

No. 635,845. Patented Oct. 31, 1899.
T. COOPER & W. H. WOODCOCK.
ROLLER BEARING.
(Application filed May 1, 1899.)
(No Model.) 2 Sheets—Sheet 2.

Witnesses:
Arthur Woodman
Walter Harry Cullis

Inventors:
Thomas Cooper
William Hugh Woodcock
per John D. O'Connell
Attorney.

UNITED STATES PATENT OFFICE.

THOMAS COOPER, OF KING'S LYNN, AND WILLIAM HUGH WOODCOCK, OF LONDON, ENGLAND.

ROLLER-BEARING.

SPECIFICATION forming part of Letters Patent No. 635,845, dated October 31, 1899.

Application filed May 1, 1899. Serial No. 715,111. (No model.)

*To all whom it may concern:*

Be it known that we, THOMAS COOPER, residing at King's Lynn, in the county of Norfolk, and WILLIAM HUGH WOODCOCK, residing at 25 Auckland Hill, West Norwood, London, in the county of Surrey, England, subjects of the Queen of Great Britain and Ireland, have invented certain new and useful Improvements in Roller-Bearings, of which the following is a specification.

Our invention relates to improvements in roller-bearings for shafts, axles, wheels, and the like, and has particular reference to that class of roller-bearings in which what are known as "frames," "cages," or "cradles" are used for separating the rollers from contact with each other and also to keep them in axial line with the axle journal or shaft.

Our invention has for its objects, first, to provide a bearing of simpler and cheaper construction than those hitherto employed and in which the frame, cage, or cradle for separating the rollers will be subjected to less strain, and, second, to provide for the retention of the rollers between the spokes or bars of said frame, cage, or cradle when the axle journal or shaft is removed or when the outer casing is removed from the bearing, as the case may be.

The frame, cage, or cradle in our invention is formed in one piece by casting. It may also be formed in two pieces by casting.

The accompanying drawings fully illustrate our invention.

Figure 3:
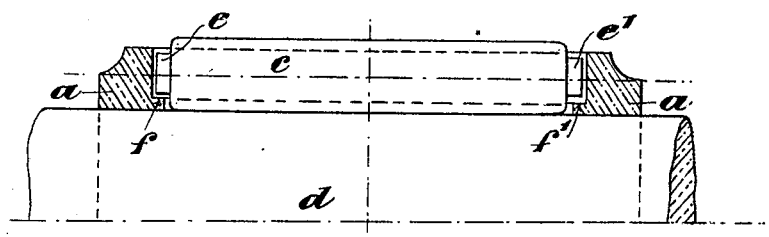
Figure 4:
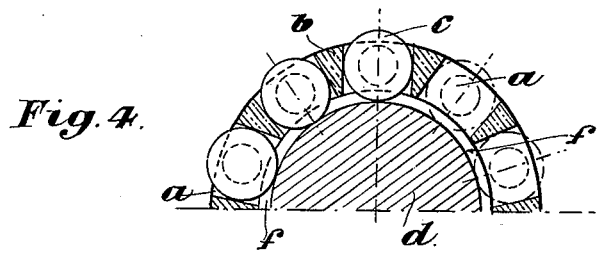
Figure 5:
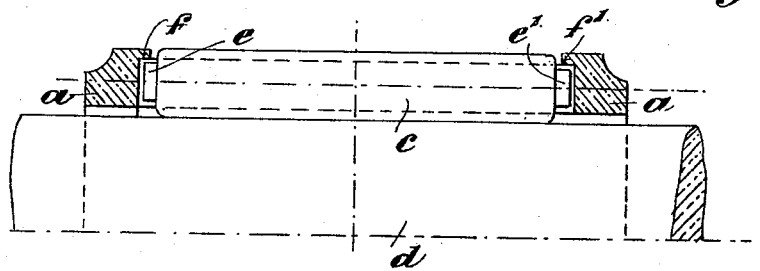
Figure 6:
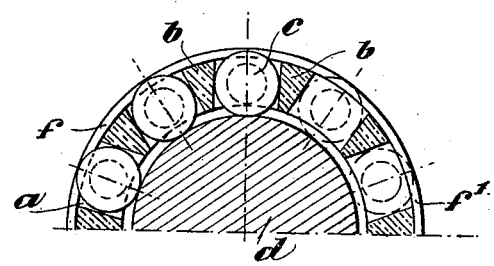

Figure 1 illustrates a sectional side elevation of a bearing according to our invention, comprising our first-mentioned improvements, the end rings of the frame, cage, or cradle being supported by or bearing on the axle journal or shaft instead of being supported by the antifriction-rollers. Fig. 2 is a cross-sectional elevation of Fig. 1. Figs. 3 and 4, part longitudinal section and part vertical cross-section, respectively, illustrate the same form of bearing provided with our means for retaining the rollers in position between the spokes or bars of the frame, cage, or cradle when the axle journal or shaft is removed, comprising our second-mentioned improvement. Figs. 5 and 6 illustrate our means for retaining the rollers between the spokes or bars of the frame, cage, or cradle when the outer casing of the bearing is removed. The end rings of the frame, cage, or cradle are shown as clear of the axle journal or shaft— that is, they do not bear on the axle journal or shaft, as shown in Figs. 1 to 4, inclusive.

The same letters refer to the same parts in the several figures.

Referring to Figs. 1 to 4 of the drawings, inclusive, the end rings $a$ of the frame, cage, or cradle for separating the rollers $c$ are arranged so as to bear on the axle journal or shaft $d$. If desired, according to our invention the spokes or bars $b$, Fig. 2, of the frame, cage, or cradle may bear on the axle journal or shaft, or both the spokes or bars $b$ and the end rings $a$ may bear on the axle journal or shaft $d$.

In Figs. 3 and 4, which illustrate our means for retaining the rollers $c$ in position between the spokes or bars $b$ of the frame, cage, or cradle, $e\ e'$ are small end projections or pips formed on the ends of the rollers $c$, and $f f'$ are flanges or projections on the inner edge of the inner faces of the end rings $a$ of the frame, cage, or cradle. When the axle journal or shaft is in position in the bearing, the projections or pips $e\ e'$ on the ends of the rollers do not touch the flanges or projections $f f'$; but when the axle journal or shaft $d$ is removed the projections or pips $e\ e'$ will bear on said flanges or projections $f f'$, thereby preventing the rollers $c$ moving from between the spokes or bars $b$ toward the center of the frame, cage, or cradle, and at the same time the cage or cradle itself will remain approximately in its correct working position.

In Figs. 5 and 6, which illustrate our means of retaining the rollers $c$ in position between the spokes or bars $b$ of the frame, cage, or cradle when the outer casing of the bearing is removed, the projections or flanges $f f'$ on the inner faces of the end rings of such cage or cradle are provided at the outer edges thereof, and it will be seen that if the outer casing of the bearing is removed the rollers $c$ cannot move outwardly from between the spokes or bars $b$ of the frame, cage, or cradle in a radial direction, owing to the pips or projections $e\ e'$ on the ends of the rollers coming in contact with or bearing against said flanges $f f'$.

Having fully described our invention, what we claim, and desire to secure by Letters Patent, is—

1. In a roller-bearing, the combination, with an axle, and a casing; of a cage comprising end rings and a series of parallel bars coupling the said rings, and rollers running on the said axle and casing in contact with the said rings and bars of the cage, the said cage being supported in position independent of the said rollers, substantially as set forth.

2. In a roller-bearing, the combination, with an axle, and a casing; of a cage comprising end rings provided with retaining-flanges $f f'$ and a series of parallel bars coupling the said rings, and rollers provided with projections on their ends which overlap the said flanges and which are normally arranged out of contact with them, said rollers being arranged to run on the said axle and casing in contact with the rings and bars of the cage, and the said cage being supported in position independent of the said rollers, substantially as set forth.

THOMAS COOPER.
W. HUGH WOODCOCK.

Witnesses:
JOHN WOOD,
CHAS. J. REEVES.